(12) United States Patent
Allen et al.

(10) Patent No.: US 9,753,239 B2
(45) Date of Patent: Sep. 5, 2017

(54) FIBER OPTIC CABLE RETENTION

(71) Applicant: Tyco Electronics Corporation, Berwyn, PA (US)

(72) Inventors: Barry Wayne Allen, Siler City, NC (US); Thomas Ross Marmon, Angier, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/734,768

(22) Filed: Jun. 9, 2015

(65) Prior Publication Data
US 2015/0378106 A1    Dec. 31, 2015

Related U.S. Application Data

(60) Provisional application No. 62/017,518, filed on Jun. 26, 2014.

(51) Int. Cl.
*G02B 6/44* (2006.01)

(52) U.S. Cl.
CPC .......... *G02B 6/4471* (2013.01); *G02B 6/4433* (2013.01); *G02B 6/4477* (2013.01)

(58) Field of Classification Search
CPC ... G02B 6/4433; G02B 6/4471; G02B 6/4477
See application file for complete search history.

(56) References Cited

U.S. PATENT DOCUMENTS

| | | | | |
|---|---|---|---|---|
| 5,048,920 A | * | 9/1991 | Newell | G02B 6/2804 385/55 |
| 6,695,491 B1 | * | 2/2004 | Leeman | G02B 6/4471 385/87 |
| 7,603,018 B2 | | 10/2009 | Mullaney et al. | |
| 8,903,216 B2 | * | 12/2014 | Thompson | G02B 6/4477 385/134 |
| 2004/0232287 A1 | * | 11/2004 | Rosemann | F16L 3/02 248/68.1 |
| 2008/0170832 A1 | * | 7/2008 | Mullaney | G02B 6/4471 385/135 |
| 2008/0285933 A1 | * | 11/2008 | Vogel | G02B 6/4452 385/135 |
| 2009/0038824 A1 | * | 2/2009 | Nakamura | H05K 3/301 174/168 |

(Continued)

FOREIGN PATENT DOCUMENTS

WO     WO 2015/199970     12/2015

OTHER PUBLICATIONS

Notification of Transmittal of the International Search Report and the Written Opinion of the International Searching Authority, or the Declaration for PCT/US2015/034870 mailed Aug. 27, 2015, 14 pp.

*Primary Examiner* — Peter Radkowski
(74) *Attorney, Agent, or Firm* — Merchant & Gould P.C.

(57) ABSTRACT

A fiber optic cable retention module includes a housing with a base. A first section extends from the base and defines a pocket for receiving strength members of a fiber optic cable. A second section extends from the base and defines slots that receive a retention member having a generally U shaped frame. The frame has first and second arms extending therefrom that define a cable receiving slot therebetween.

24 Claims, 6 Drawing Sheets

(56) References Cited

U.S. PATENT DOCUMENTS

2011/0091169 A1* 4/2011 Van Der Meulen ............................ G02B 6/4472
  385/100
2012/0230646 A1* 9/2012 Thompson ........... G02B 6/4477
  385/135
2014/0037250 A1* 2/2014 Treadwell ............ G02B 6/3887
  385/78

* cited by examiner

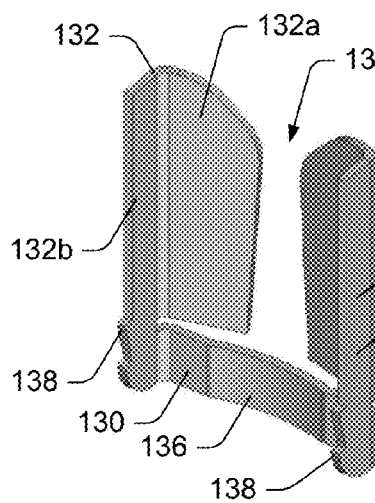
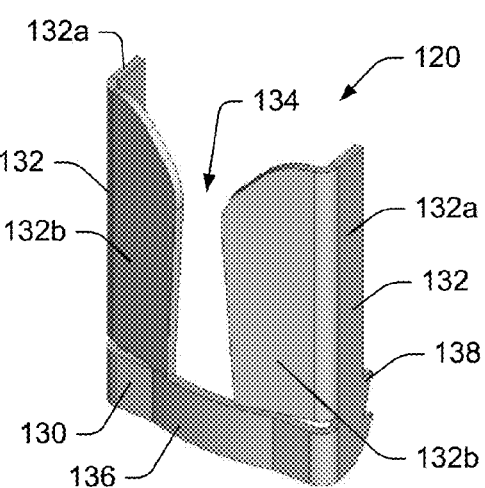
FIG. 8
FIG. 9
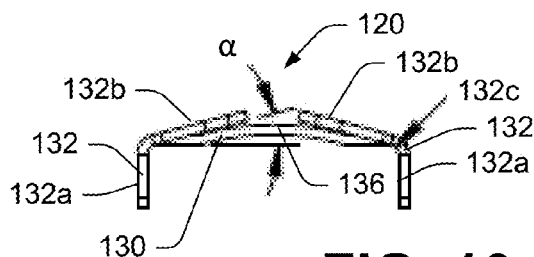
FIG. 10
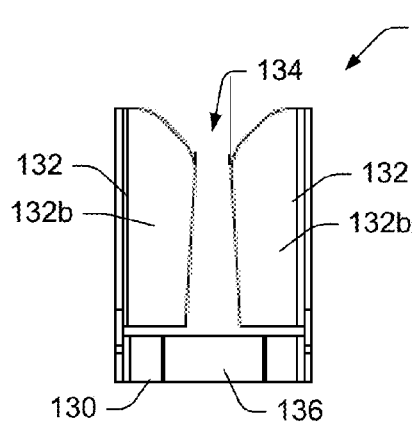
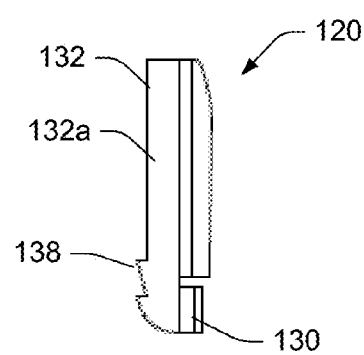
FIG. 11
FIG. 12

FIBER OPTIC CABLE RETENTION

CROSS REFERENCE TO RELATED APPLICATIONS

This application claims the benefit of U.S. Provisional Patent Application No. 62/017,518, filed Jun. 26, 2014, which application is hereby incorporated by reference in its entirety.

BACKGROUND

The present disclosure relates generally to fiber optic cable systems.

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber management is an important part of operating and maintaining an effective fiber optic communication system.

Optical fibers are often connected to one another via splices. For example, a trunk or main cable may be routed to an area to which service is to be provided and small fiber count "drop cables" may be spliced to the main cable at predetermined spaced apart locations. Splices are often supported within splice enclosures to protect the spliced connections from the environment. The fiber optic cable is typically secured to the enclosure, for instance by removing the cable outer jacket in order to expose some length of the strength members of the cable. The cable strength elements are typically attached to the enclosure so as to provide strain relief.

SUMMARY

In accordance with aspects of the present disclosure a fiber optic cable retention module includes a housing having a base. A first section extends from the base and defines a pocket for receiving strength members of a fiber optic cable. A second section extends from the base and defines first and second generally L shaped opposing slots. A retention member or blade is received in the slots. Examples of the retention member have a generally U shaped frame with first and second arms extending therefrom. The arms are each generally L shaped to correspond to the shape of the slots, and a cable receiving slot is defined between the arms.

In accordance with further aspects of the disclosure, the fiber optic cable retention module may provide strain relief for a fiber optic cable. For example, strength members of the cable may be received in the pocket and a cable jacket of the cable may be received in the cable receiving slot. In some embodiments, a fastener opening is defined in the base that receives a fastener extending from a surface, such as an interior or exterior surface of a cable enclosure. The fastener includes a locking tab that is received by a locking opening defined by the first section of the housing to secure the cable to the surface and provide strain relief.

BRIEF DESCRIPTION OF THE DRAWINGS

FIG. 8 is a first perspective view illustrating an example of a retention member of the fiber optic cable retention module illustrated in FIGS. 1 and 2.

FIG. 9 is a second perspective view illustrating the retention member shown in FIG. 8.

FIG. 10 is a top view illustrating the retention member shown in FIG. 8.

FIG. 11 is a rear view illustrating the retention member shown in FIG. 8.

FIG. 12 is a side view illustrating the retention member shown in FIG. 8.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

Flat drop style fiber optic cables are broadly used in fiber optic cable networks. In addition to the optical fibers, a typical fiber optic cable may include cable jacketing material, cable strength members and fiber containment tubes, for example. It may be desirable in many situations to provide strain relief and limit or even prevent the cable jacketing and the cable strength members from axial displacement relative to one another, and/or relative to a cable enclosure or other device attached to the cable. A typical situation in which the securing is desired is where an opening has been made in the fiber optic cable for accessing the internal optical fibers, and where a splice enclosure may be installed.

When flat drop style cables enter a fiber optic enclosure such as a splice enclosure and undergo strain relief, strain relief for all individual flat drop cables will commonly occur on a shared single, fixed location component. In accordance with certain aspects of the present disclosure, a fiber optic cable retention module is provided that allows flat drop style cables the flexibility to be strain relieved independently and individually placed. Examples of the disclosed module attach to an end of an individual fiber optic cable, such as a flat drop style cable. Although there is variation in the dimensional size of flat drop cables, embodiments of the disclosed strain relief module can be achieved strain relief for a significant portion of those.

Figure 1:
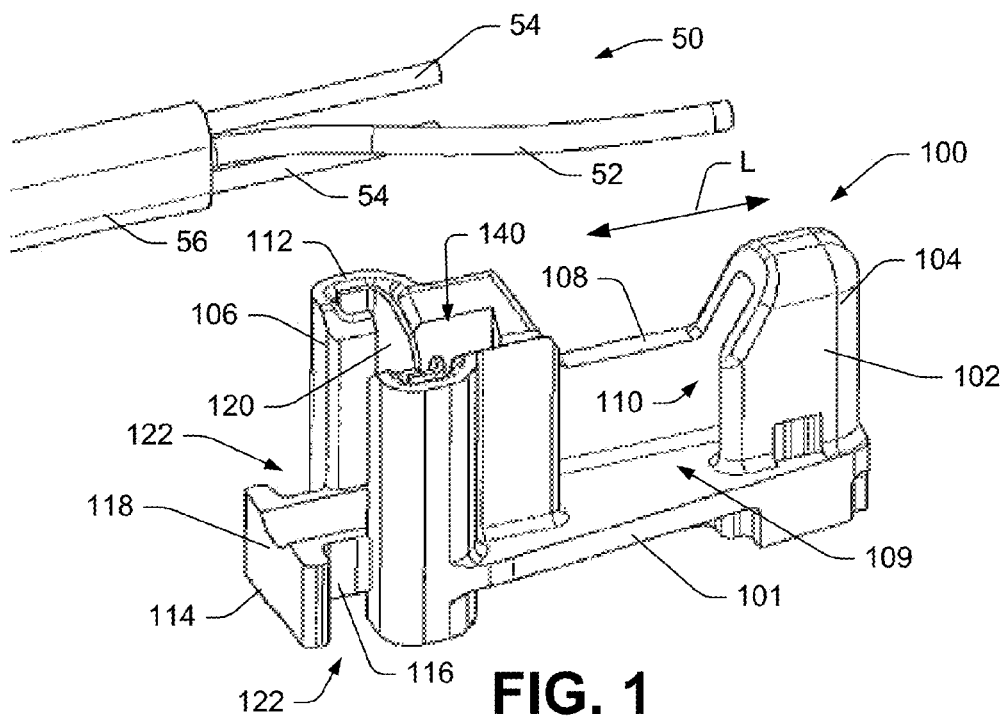
FIG. 1 is a perspective view illustrating aspects of an example of a fiber optic cable retention module in accordance with the present disclosure, showing a fiber optic cable prior to insertion into the module.

Generally, the examples of the disclosed strain relief module include a housing such as an injection molded plastic body with a press fitted, U-shaped metal retention blade received therein. The body is structured so as to be mounted onto various locations of a receiving structure such as a splice enclosure. FIG. 1 illustrates an example of a fiber optic cable retention module 100 in accordance with aspects of the present disclosure. As noted above the module 100 is configured for receiving and retaining a fiber optic cable 50, which has a lengthwise (longitudinal) cable axis L and includes a plurality of optical fibers 52 (shown in the figures as contained in a buffer tube), a pair of strength members 54 and a jacket 56 surrounding the optical fibers 52.

In this disclosure, the terms longitudinal and lengthwise are used interchangeably to refer to a direction along the cable axis L, which is parallel to a longitudinal axis L of the module 100 when the cable is retained in the module 100. Further, portions of the cable 50, in practice, will generally be cut so as to provide an access opening to the optical fibers 52. In some of the drawings figures discussed herein, all components of the cable 50 appear cut. However, it will be understood that this is for illustrative purposes as the optical fibers 52 and/or buffer tube including optical fibers may be cut for splicing in the enclosure or may be uncut through fibers. Furthermore, while in some illustrations the entire jacket 56 is shown as removed to provide the opening, in some implementations, portions of the jacket 56 remain while sufficient amounts of the jacket 56 are removed to allow access to the fiber(s) 52 and strength member(s) 54. One or more splices may be formed between the fiber(s) 52 and other fibers or the like.

The retention module 100 includes a housing 102 having a base 101. In some examples, the housing 102 is an injection molded plastic body. The housing 102 further includes a first, or forward, section 104 and a second, or rear, section 106 extending from the base, with a side wall 108 extending from the base 102 between the first section 104 and the second section 106 to connect the first and second sections 104, 106. In the illustrated examples, the sidewall 108 extends on one side of the module 100. On the opposite side of the module, an opening 109 is defined between the first and second sections 104, 106. The first section 104 forms a pocket 110 for receiving the strength members 54 of the cable 50 as will be discussed further below. The second section 106 forms opposing slots 112 for receiving a retention member or blade 120. In the illustrated example, the retention member 120 is slidably received in the slots 112. A retention ledge 114 extends from the second section 106 for receiving the cable 50 such that the jacket 56 rests thereon. The ledge 114 is generally T-shaped, having a central portion 116 extending from the second section 106 with a cross member 118 extending transversely therefrom. The portions of the cross member 118 extending from the central portion 116 and the end surface of the second section 114 of the housing 102 define cable-securing channels 122 for receiving a cable-securing member such as a tie wrap 124 (see FIGS. 3 and 5-7). The securing member extends around the ledge 114 and jacket 56 and seats in the channels 122 to fasten the cable 50 to the module 100 as will be discussed further below.

In the illustrated embodiment, the slots 112 formed in the second section 106 are each generally L-shaped. As best shown in the top view of FIG. 5, the slots 112 each have a first portion 112a extending generally in the direction of the cable axis L and a second portion 112b extending towards the center of the rear portion 106 and towards the cable 50. The retention member 120 is correspondingly shaped to be received in the slots 112. Referring to FIGS. 8-12, an example of the retention member 120 is illustrated. The retention member 120 includes a frame 130 with two arms 132 extending upwardly therefrom. The arms 132 are generally L shaped, having first and second portions 132a,132b corresponding to the shape of the slots 112a,112b. Thus, the first portion 132a extends generally parallel to the axis L, while the second portions 132b extend generally towards each other, inwardly toward the center of the module 100. In the illustrated example, the second portion 132b is bent inwardly from the first portion 132a such that there is a radiused junction 132c between the portions 132a, 132b of the arms 132. Further, in the embodiment illustrated, the second portion 132b does not extend from the first portion 132a at a right angle, but rather is offset from a line perpendicular to the first portion 132a by an angle α. In some embodiments, the angle α is between 12-18°, and in certain embodiments the angle α is 15°.

A gap between the arms 132 defines a cable receiving slot 134. As noted above, in the illustrated embodiment the arms 132 are angled at an angle α, so that when the retention member 120 is received in the slots 112, the arms 132 are angled toward the first section 104 of the housing 102. As such, with the cable 50 inserted therein, the arms 132 are especially resistant to pulling of the cable longitudinally out of the housing 102. In other words, when installed in an enclosure, if an operator were to inadvertently try to pull the cable 50 out of the enclosure, the arms 132 would flex to increase the gripping force applied to the cable 50 and prevent lateral movement thereof.

In the illustrated embodiment, the frame 130 of the retention member 120 includes a curved segment 136 in a central portion of the frame 130. As shown in the top view of FIG. 10, the illustrated example of the frame 130 of the retention member 120 is generally U-shaped, and a lower segment of the arm first portions 132a proximate the curved segment 136 of the frame 130 forms one or more barbs 138. The retention member 120 may be a metal material, such as spring steel, and when the retention member 120 is inserted in the slots 112, an interference fit with the slot 112 may flex the curved segment 136. Further, the barbs 138 may engage the material of the housing defining the slots 112. As a result, a retention force may be applied between the slots 112 and the frame 130 to help with secure placement of the retention member 120 in the slots 112.

The second section 106 includes a longitudinally extending channel 140 configured to receive a segment of the cable 50 where the cable jacket 56 is still intact. In the illustrated examples, the cable 50 is a flat drop cable. As such, the channel 140 includes substantially flat sidewalls displaced from each other transversely a distance allowing insertion of the cable 50 therebetween. In some embodiments, a transverse width of the channel may be slightly less than that of the cable 50 to allow an interference fit that may serve to hold the cable 50 in place until it is secured in place by, for example, the tie wrap 124 or other connector. In other embodiments, the channel width may be slightly more that of the cable 50, using other features to retain the cable without use of an interference fit.

Figure 2:
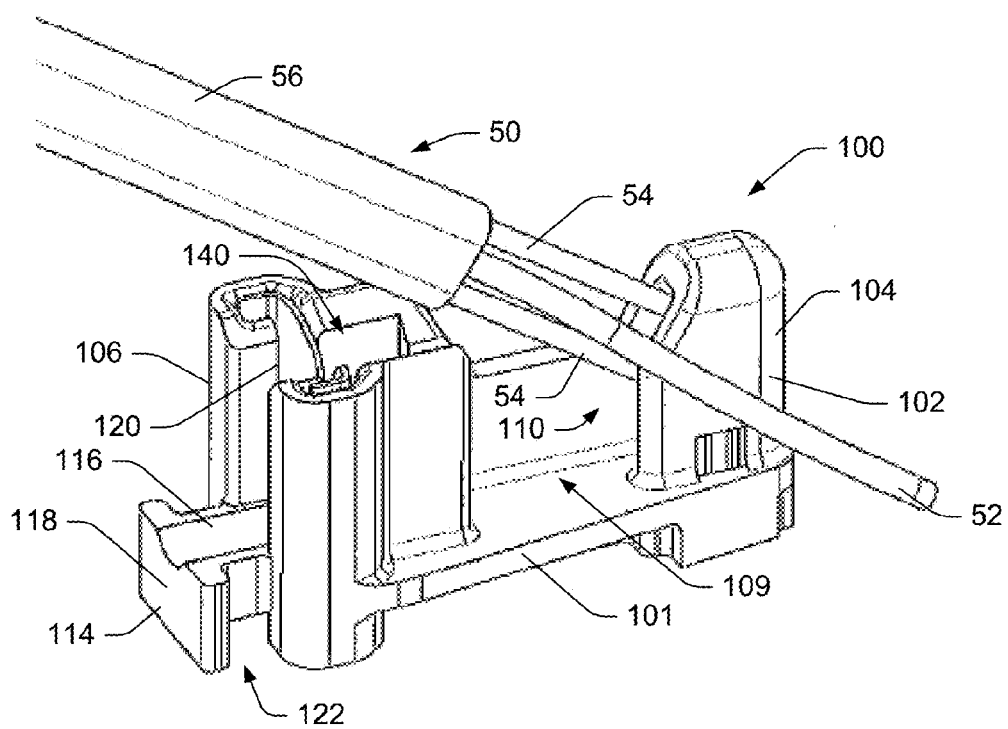
FIG. 2 is a perspective view of the fiber optic cable retention module illustrated in FIG. 1, showing the fiber optic cable partially inserted into the module.
Figure 3:
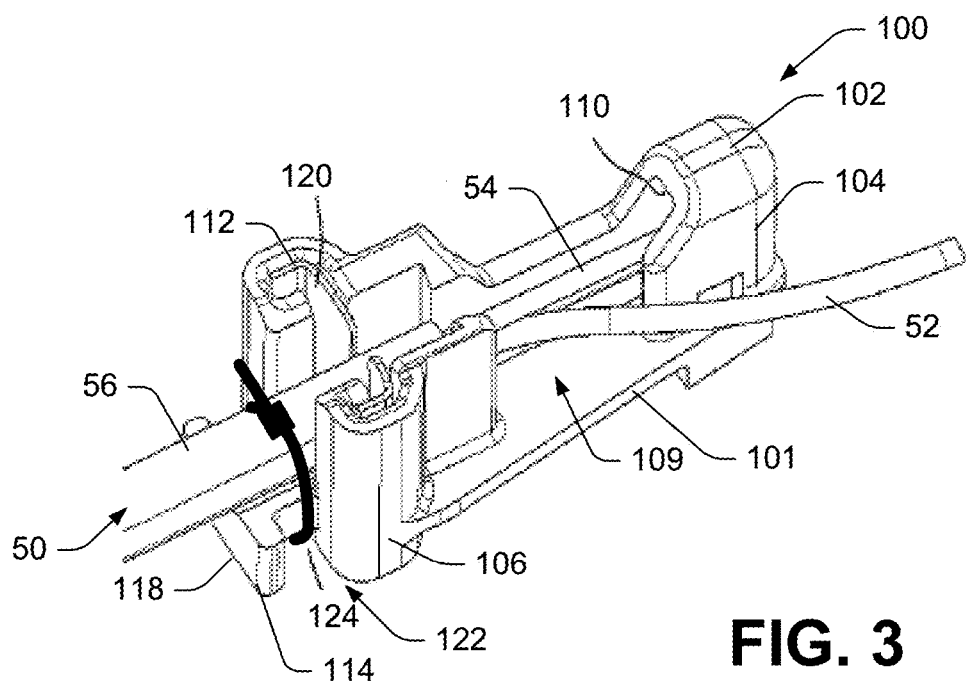
FIG. 3 is a first perspective view of the fiber optic cable retention module illustrated in FIGS. 1 and 2, showing the fiber optic cable received in the module.
Figure 4:
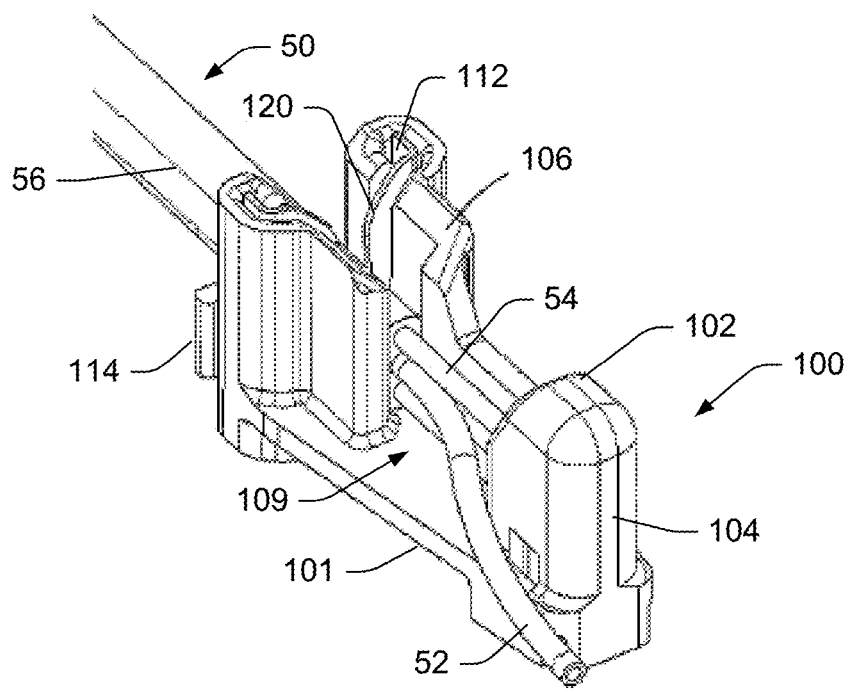
FIG. 4 is a second perspective view of the fiber optic cable retention module illustrated in FIGS. 1 and 2, showing the fiber optic cable received in the module.
Figure 5:
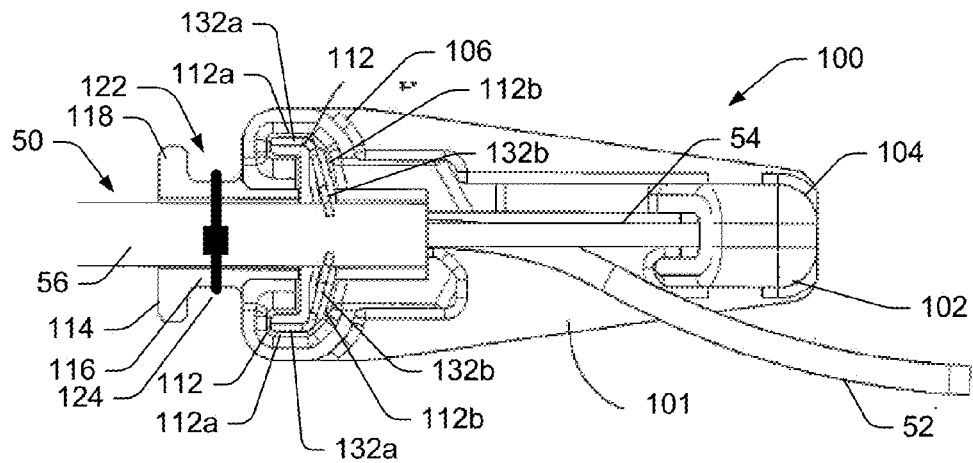
FIG. 5 is a top view of the fiber optic cable retention module illustrated in FIGS. 1 and 2.
Figure 6:
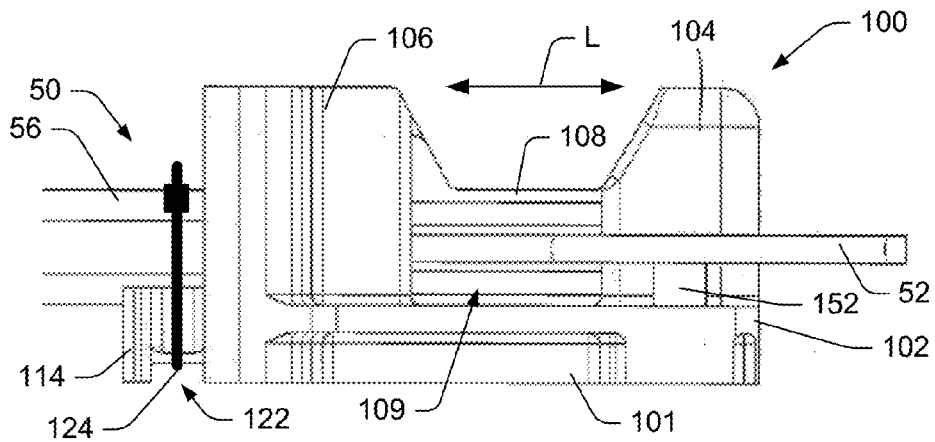
FIG. 6 a side view of the fiber optic cable retention module illustrated in FIGS. 1 and 2.

The pocket 110 formed in the first section 104 of the housing 102 is configured to receive the strength members 54 of the cable 50. As shown in FIG. 1, the cable 50 is cut and a portion of the jacket 56 is removed. The strength members 54 are cut to the desired length, and the optical fiber(s) 52 may also be cut as necessary for the particular application. The exposed strength members 54 slide into the pocket 110 as shown in FIG. 2, and then the cable 50 is pushed down into the retention member 120 and into the gap 134 between the arms 132 as illustrated in FIGS. 3 and 4. The fastener 124 then wraps around the cable 50 and the retention ledge 114 to secure the cable 50 in the module 100. The sidewall 108 extends on only one side of the module 100, leaving the opening 109 so that the optical fiber(s) 52 can extend from the module 100. The process of securing the cable 50 to the module 100 can be done outside a fiber optic splice enclosure depending on sealing mechanisms, simplifying the act of fastening the cable 50 to the module 100.

Figure 7:
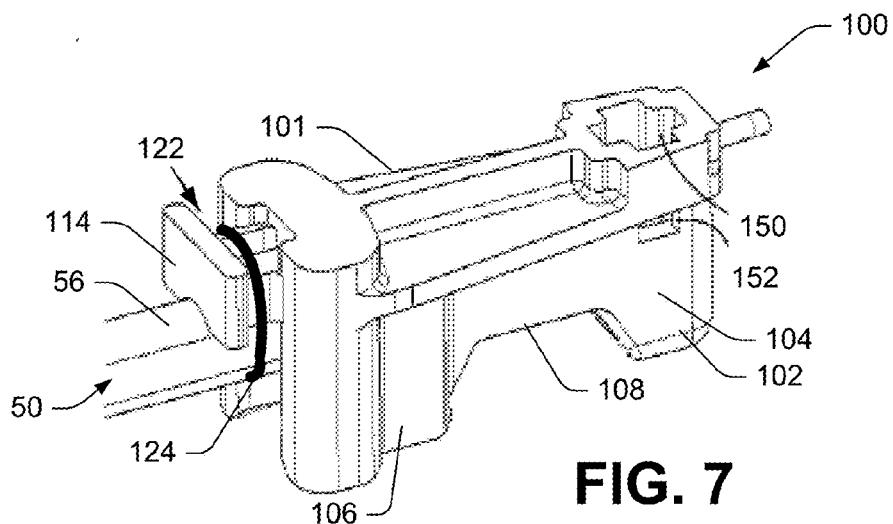
FIG. 7 is a bottom perspective view of the fiber optic cable retention module illustrated in FIGS. 1 and 2.
Figure 13:
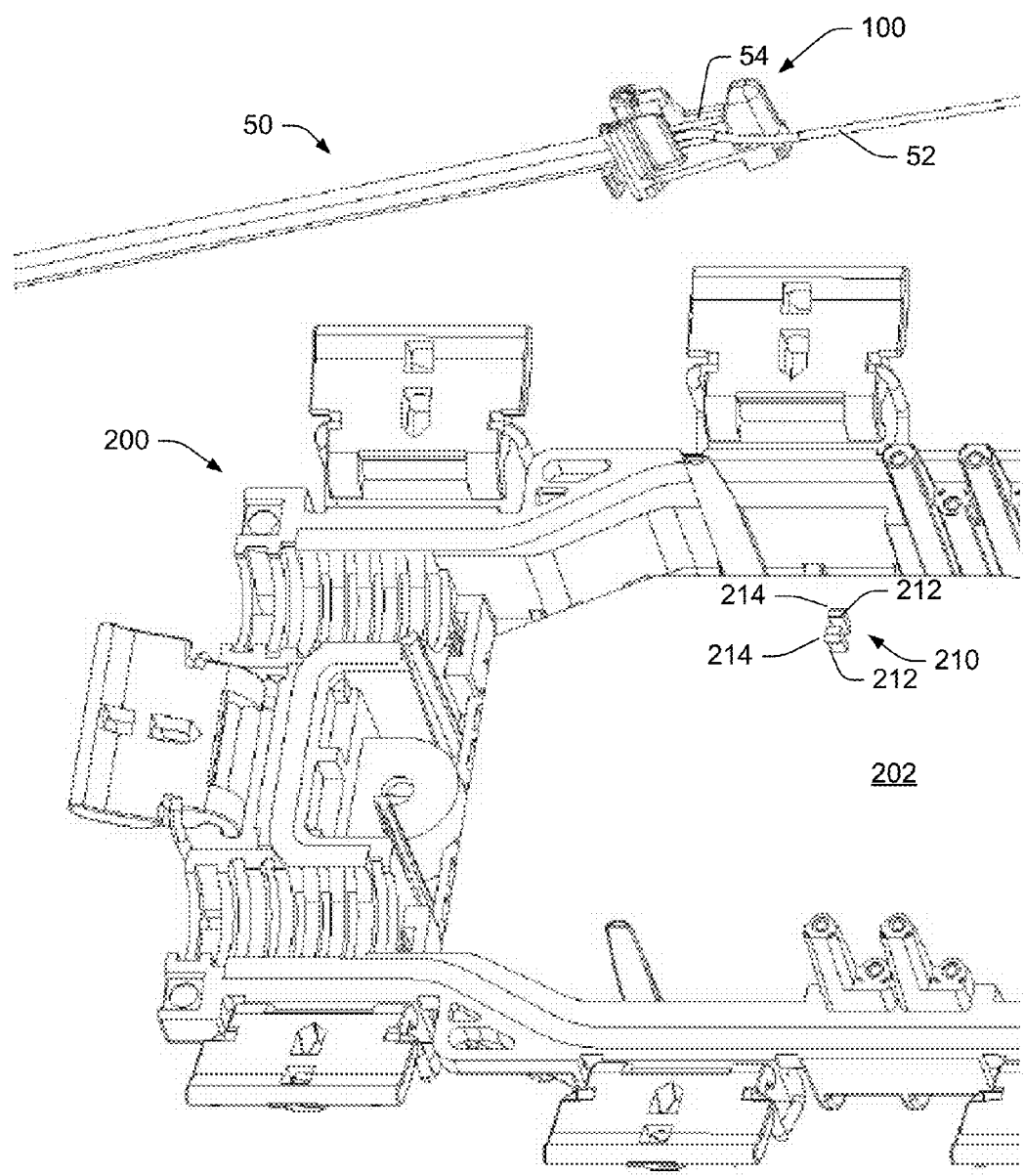
FIG. 13 is a perspective view of a fiber optic cable strain relief system in accordance with aspects of the present disclosure, including a fiber optic cable retention module such as that illustrated in FIG. 1, prior to being fastened to an enclosure.
Figure 14:
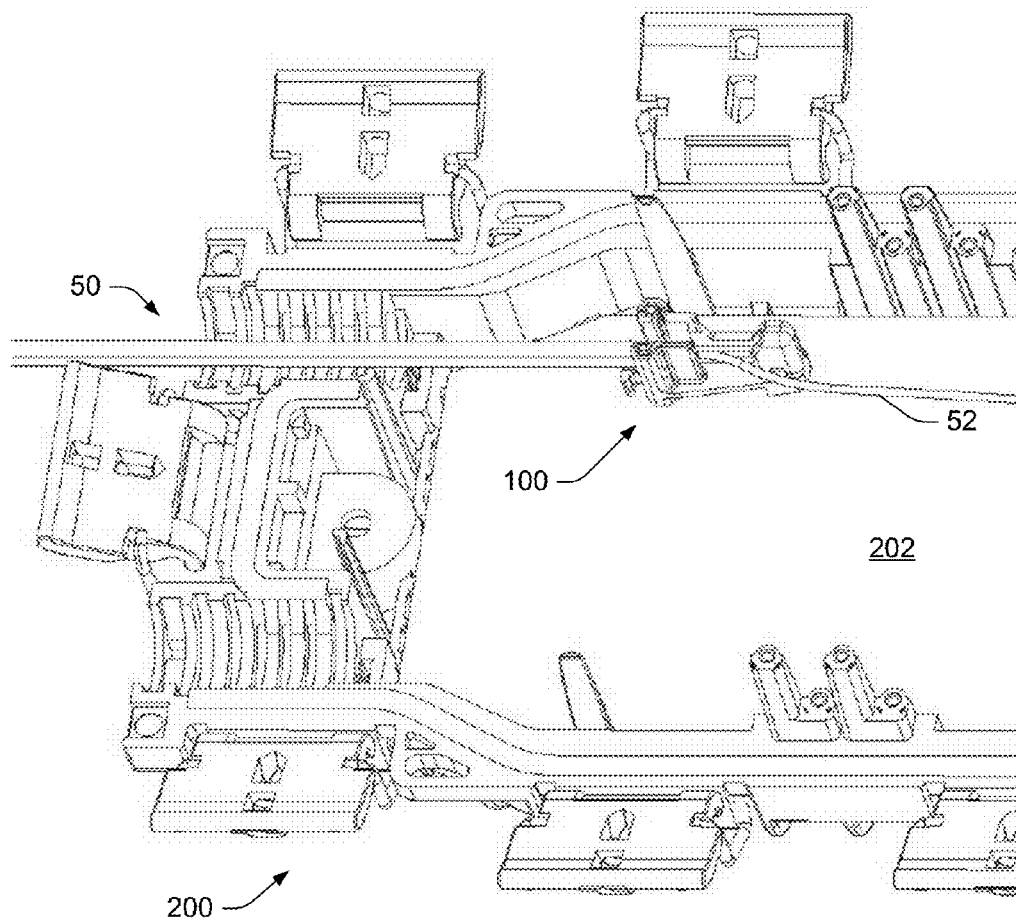
FIG. 14 is a perspective view of the fiber optic cable strain relief system shown in FIG. 13, with the fiber optic cable retention module fastened to the enclosure.

To provide strain relief in an enclosure such as a splice enclosure, the base 101 of the housing 102 defines a fastener opening 150 in a bottom surface opposite the first section 104 of the housing 102 as shown in FIG. 7. FIG. 13 illustrates the module 100 prior to being fastened to a splice enclosure 200. The splice enclosure 200 includes a fastener 210 extending therefrom. The module 100 is situated over the fastening tab 210, such that the fastener opening 150 receives the fastener 210 to lock the module 100 onto the splice enclosure 200. FIG. 14 illustrates the module 100 fastened to the splice module, thus providing strain relief for the cable 50.

In the example shown in FIG. 7, the fastener opening 150 is generally cross-shaped. A locking opening 152 is formed in opposite sides of the first section 104 of the housing 102. Referring back to FIG. 13, the fastener 210 includes a pair of opposing resilient spring fingers 212 extending from a surface 202 of the splice enclosure 200. For ease of illustration, in FIG. 13 a single fastener 210 is shown extending from the surface 202, which is situated inside the enclosure 200. In other implementations, the fastener 210 may extend from other surfaces internal or external to the enclosure 200.

In other embodiments, several fasteners 210 may be provided. For example, the fasteners 210 may be arranged in predetermined locations within the splice enclosure 200, on one or more surfaces 202 thereof. The fingers 212 may be fabricated from a flexible material such as plastic, and may be integrally molded with components of the splice enclosure 200. The spring fingers 212 include respective locking tabs 214 extending therefrom. When the module 100 is pushed onto the fastening tab 210, the spring fingers 212 are received in the fastener opening 150 and flex inwardly as they are inserted into the fastener opening 150. When the locking tabs 214 reach the locking openings 152, the fingers 212 return to their original positions such that the locking tabs 214 snap into the locking openings 152, locking the module 100 in place on the surface 202 of the splice enclosure 200.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:

1. A fiber optic cable retention module, comprising:
   a housing including a base;
   a first section extending from the base and defining a pocket for receiving strength members of a fiber optic cable;
   a second section extending from the base and defining first and second generally L shaped opposing slots; and
   a retention member received in the first and second generally L shaped opposing slots;
   the retention member including a generally U shaped frame having first and second arms and a bridge segment extending between the first and second arms to define a bottom portion of the U shaped frame, each one of the first and second arms extending perpendicularly relative to the bridge segment, the first and second arms each including a blade member and a fixed junction respectively positioned between the blade member and the first and second arms, the fixed junction respectively creating a bend between the blade member and the first and second arms such that the blade member is flexibly cantilevered from the first and second arms, the first and second arms together defining a cable receiving slot therebetween.

2. The fiber optic cable retention module of claim 1, further comprising:
   a sidewall extending from the base and connecting the first and second sections on a first side of the module; and
   an opening defined between the first and second sections on a second side of the module opposite the first side.

3. The fiber optic cable retention module of claim 1, wherein the bridge segment of the frame of the retention member includes a curved portion formed in a central location thereof.

4. The fiber optic cable retention module of claim 1, wherein the blade member is respectively situated at a non-right angle relative to the first and second arms.

5. The fiber optic cable retention module of claim 1, wherein the first and second arms extend generally parallel to a longitudinal axis of the module.

6. The fiber optic cable retention module of claim 1, wherein lower portions of each one of the first and second arms define respective barbs that engage the first section of the housing defining the slots.

7. The fiber optic cable retention module of claim 1, wherein the base defines a fastener opening in a bottom surface opposite the first section of the housing.

8. A cable strain relief system, comprising:
   a surface;
   a fastener extending from the surface, the fastener including a first locking tab;
   a retention housing including a base;
   a first section extending from the base and defining a pocket for receiving strength members of a fiber optic cable;
   a second section extending from the base and including a retention member defining a cable receiving slot, the retention member including a generally U shaped frame having first and second arms and a bridge segment extending between the first and second arms to define a bottom portion of the U shaped frame, each one of the first and second arms extending perpendicularly relative to the bridge segment, the first and second arms each including a blade member and a fixed junction respectively positioned between the blade member and the first and second arms, the fixed junction respectively creating a bend between the blade member and the first and second arms such that the blade member is flexibly cantilevered from the first and second arms;

a fastener opening defined in the base and receiving the fastener; and a first locking opening defined by the first section, the first locking opening receiving the first locking tab.

9. The cable strain relief system of claim 8, further comprising a cable enclosure, wherein the surface is situated inside the cable enclosure.

10. The cable strain relief system of claim 8, wherein:

the fastener includes first and second resilient spring fingers, the first locking tab extending from the first resilient spring finger, the second resilient spring finger having a second locking tab extending therefrom; and the second section further defines a second locking opening, the second locking opening receiving the second locking tab.

11. The cable strain relief system of claim 8, wherein:

the second section defines first and second opposing slots; and the retention member is received in the first and second opposing slots.

12. The cable strain relief system of claim 11, wherein:

the first and second opposing slots are each generally L shaped, the first and second arms each being generally L shaped to be received in the respective first and second opposing slots.

13. The cable strain relief system of claim 12, wherein the bridge segment of the frame of the retention member includes a curved portion formed in a central location thereof.

14. The cable strain relief system of claim 8, wherein the blade member is respectively situated at a non-right angle relative to the first and second arms.

15. The cable strain relief system of claim 8, wherein the first and second arms extend generally parallel to a longitudinal axis of the module.

16. The cable strain relief system of claim 8, wherein lower portions of the first and second arms define respective barbs that engage the first section.

17. The cable strain relief system of claim 8, further comprising:

a sidewall extending from the base and connecting the first and second sections on a first side of the retention housing; and an opening defined between the first and second sections on a second side of the retention housing opposite the first side.

18. The cable strain relief system of claim 8, further comprising a fiber optic cable having an optical fiber, a strength member and a cable jacket, the strength member being received in the pocket, the cable jacket being received in the cable receiving slot.

19. A retention clip adapted to be mounted to a substrate for retaining a fiber optic cable, comprising:

a curved segment;

a pair of upstanding, spaced-apart arms coupled to the curved segment, the pair of upstanding, spaced-apart arms extending perpendicularly relative to the curved segment; and first and second, opposed, blade portions each having a fixed end adjoining a respective one of the pair of upstanding, spaced-apart arms so that the first and second, opposed, blade portions are cantilevered from the pair of upstanding, spaced-apart arms; and wherein free ends of the first and second, opposed, blade portions have opposing blade edges together defining a slot therebetween for receiving a cable.

20. The retention clip of claim 19, wherein a plurality of retention clips are arranged in a staggered array on the substrate to provide strain relief for a variety of fiber optic cables varying in size.

21. The retention clip of claim 19, wherein the slot has a width that is less than a width of the cable.

22. A cable strain relief system, comprising:

a component with at least one fastening tab;

a cable anchoring unit including:

a cable fixation structure; and a strength member stop; and a cable being attached to the cable anchoring unit such that an end of a strength member of the cable is adjacent the strength member stop, the cable fixation structure receiving the least one fastening tab for attaching the cable anchoring unit to the component; and a retention member defining a cable receiving slot, the retention member including a generally U shaped frame having first and second arms and a bridge segment extending between the first and second arms to define a bottom portion of the U shaped frame, each one of the first and second arms extending perpendicularly relative to the bridge segment, the first and second arms each including a blade member and a fixed junction respectively positioned between the blade member and the first and second arms, the fixed junction respectively creating a bend between the blade member and the first and second arms such that the blade member is flexibly cantilevered from the first and second arms.

23. The cable strain relief system of claim 22, wherein a snap fit connection is between the component and the cable anchoring unit.

24. The cable strain relief system of claim 22, wherein the component is a splice enclosure.

* * * * *